(12) United States Patent
Miescher

(10) Patent No.: US 11,746,814 B2
(45) Date of Patent: Sep. 5, 2023

(54) STRIP OF FASTENING ELEMENTS

(71) Applicant: HILTI AKTIENGESELLSCHAFT, Schaan (LI)

(72) Inventor: Stefan Miescher, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 273 days.

(21) Appl. No.: 16/769,387

(22) PCT Filed: Nov. 20, 2018

(86) PCT No.: PCT/EP2018/081883
§ 371 (c)(1),
(2) Date: Jun. 3, 2020

(87) PCT Pub. No.: WO2019/120827
PCT Pub. Date: Jun. 27, 2019

(65) Prior Publication Data
US 2021/0180632 A1    Jun. 17, 2021

(30) Foreign Application Priority Data

Dec. 20, 2017 (EP) ...................................... 1720903

(51) Int. Cl.
*F16B 15/08* (2006.01)
*B25C 1/18* (2006.01)
(52) U.S. Cl.
CPC .............. *F16B 15/08* (2013.01); *B25C 1/184* (2013.01)
(58) Field of Classification Search
CPC .......... B25C 1/184; B25C 1/182; F16B 15/08
See application file for complete search history.

(56) References Cited

U.S. PATENT DOCUMENTS 4,047,611 A * 9/1977 Damratowski ....... B25B 23/045
206/820
5,046,396 A * 9/1991 Pfister ..................... F16B 19/14
89/35.01
(Continued)

FOREIGN PATENT DOCUMENTS

CA   2 408 421 A1   4/2003
CN     1434220 A    8/2003
(Continued)

OTHER PUBLICATIONS

International Bureau, International Search Report in International Application No. PCT/EP2018/081883, dated Mar. 18, 2019.

*Primary Examiner* — Adriana Figueroa
(74) *Attorney, Agent, or Firm* — Leydig Voit & Mayer Ltd.

(57) ABSTRACT

A strip of fastening elements having receiving elements and fastening elements received in the receiving elements is provided, the fastening elements each defining a fastening direction that is the same for all fastening elements, wherein the receiving elements are arranged in at least one row, which defines a transport direction, the at least one strip including a frontmost receiving element and a rearmost receiving element, wherein the fastening direction and the transport direction enclose an acute angle, wherein the strip of fastening elements has a support element for supporting the frontmost receiving element counter to the fastening direction and/or a counter-support element for supporting the rearmost receiving element in the fastening direction.

7 Claims, 1 Drawing Sheet

(56) References Cited

U.S. PATENT DOCUMENTS

| | | | |
|---|---|---|---|
| 5,069,340 A * | 12/1991 | Ernst | B25C 1/184 |
| | | | 206/820 |
| 5,836,732 A * | 11/1998 | Gupta | F16B 15/08 |
| | | | 411/443 |
| 6,267,284 B1 | 7/2001 | Clark | |
| 6,502,737 B2 | 1/2003 | Akiba | |
| 6,814,231 B2 * | 11/2004 | Gupta | F16B 15/08 |
| | | | 411/443 |
| 7,108,130 B2 | 9/2006 | Herelier et al. | |
| 8,517,238 B2 | 8/2013 | Gensmann et al. | |
| 9,206,826 B2 | 12/2015 | Bindig et al. | |
| 2002/0060233 A1 | 5/2002 | Akiba | |
| 2003/0075466 A1 | 4/2003 | Herelier et al. | |
| 2003/0136693 A1 | 7/2003 | Gupta | |
| 2005/0001007 A1 | 1/2005 | Butzen et al. | |
| 2005/0263419 A1 | 12/2005 | Herelier et al. | |
| 2009/0120818 A1 | 5/2009 | Del Hoyo | |
| 2010/0140123 A1 | 6/2010 | Miescher et al. | |
| 2012/0048909 A1 | 3/2012 | Gensmann et al. | |
| 2012/0282063 A1 | 11/2012 | Kieber et al. | |
| 2014/0186140 A1 | 7/2014 | Bindig et al. | |

FOREIGN PATENT DOCUMENTS

| | | | |
|---|---|---|---|
| CN | 102011777 A | | 4/2011 |
| CN | 102765551 A | | 11/2012 |
| CN | 103547817 A | | 1/2014 |
| CN | 206617404 U | | 11/2017 |
| DE | 19957109 A1 | | 5/2001 |
| EP | 0987086 A2 | | 3/2000 |
| EP | 1705387 A1 | | 9/2006 |
| EP | 2193883 A1 | | 6/2010 |
| EP | 2520812 A2 | | 11/2012 |
| GB | 1345952 A | * | 2/1974 |
| JP | S55-107105 A | | 8/1980 |
| JP | 2014-519416 A | | 8/2014 |
| KR | 20100043050 A | * | 4/2010 |
| SU | 1539056 A1 | | 1/1990 |
| TW | 521026 B | | 2/2003 |

* cited by examiner

STRIP OF FASTENING ELEMENTS

CROSS-REFERENCE TO RELATED APPLICATIONS

This patent application is the U.S. National Stage of International Patent Application No. PCT/EP2018/081883, filed Nov. 20, 2018, which claims the benefit of European Patent Application No. 17209038.3, filed Dec. 20, 2017, which are each incorporated by reference.

TECHNICAL FIELD

The application relates to a strip of fastening elements.

BACKGROUND OF THE INVENTION

Driving devices usually have a setting channel for fastening elements, said setting channel extending in a fastening direction, and a magazine for transport of the fastening elements in a transport direction to the setting channel. The fastening elements are usually made available in the form of strips of fastening elements, wherein such a strip of fastening elements comprises receptacles for the fastening elements. The receptacles of a strip are arranged in a row and connected to one another by means of connecting webs. The strips of fastening elements are introduced one after another into a transport channel of the magazine.

Magazines and strips of fastening elements are known in which the fastening direction and the transport direction enclose an acute angle. This means that the fastening elements are offset relative to one another in the fastening direction such that a frontmost fastening element in the transport direction is also the frontmost fastening element in the fastening direction. If a plurality of strips of fastening elements are arranged behind one another in the transport channel, this has the effect that a strip of fastening elements succeeding in the transport direction exerts a force on a strip of fastening elements preceding in the transport direction, said force having a force component counter to the fastening direction. This results in increased friction during the transport of the strips of fastening elements.

BRIEF SUMMARY OF THE INVENTION

It is an object of the invention to make available a strip of fastening elements that is easily transportable in a magazine.

The object is achieved by a strip of fastening elements having receiving elements and fastening elements received in the receiving elements, said fastening elements each defining a fastening direction that is the same for all fastening elements, wherein the receiving elements are arranged in at least one row, which defines a transport direction, a frontmost receiving element and a rearmost receiving element, wherein the fastening direction and the transport direction enclose an acute angle, wherein the strip of fastening elements has a support element for supporting the frontmost receiving element counter to the fastening direction and/or a counter-support element for supporting the rearmost receiving element in the fastening direction. Through the support of the frontmost and rearmost receiving element, a force component exerted on the receiving element in the fastening direction or counter to the fastening direction is taken up, such that frictional forces during the transport of the strip of fastening elements in a transport channel of a magazine are reduced.

An advantageous embodiment is characterized in that the frontmost receiving element has the support element and/or the rearmost receiving element has the counter-support element.

An advantageous embodiment is characterized in that the support element is suitable for supporting the frontmost receiving element on a counter-support element of a preceding strip of fastening elements that is arranged in front of the strip of fastening elements in the transport direction, and/or the counter-support element is suitable for supporting the rearmost receiving element on a support element of a succeeding strip of fastening elements that is arranged behind the strip of fastening elements in the transport direction.

An advantageous embodiment is characterized in that the support element comprises a projection, which protrudes in the transport direction from the frontmost receiving element, and/or the counter-support element comprises a counter-support projection, which protrudes from the rearmost receiving element counter to the transport direction.

An advantageous embodiment is characterized in that the receiving elements each comprise a sleeve, in which one of the fastening elements is received.

An advantageous embodiment is characterized in that the strip of fastening elements is suitable for being transported in a transport direction in a transport channel of a magazine of a driving device. The fastening elements are preferably configured as nails, pins, bolts, screws, dowels, anchors or similar.

The object is likewise achieved by a fastening device having a magazine, a first strip of fastening elements and a second strip of fastening elements, wherein the magazine has a transport channel for transport of the first and second strips of fastening elements in a transport direction, wherein the first and second strips of fastening elements are configured according to one of the embodiments described above. Preferably, the support element of the strip of fastening elements succeeding in the transport direction and the counter-support element of the strip of fastening elements preceding in the transport direction are in engagement with each other and support each other.

BRIEF DESCRIPTION OF THE SEVERAL VIEWS OF THE DRAWINGS

Embodiments of a device for driving a fastening element into a base are explained in more detail below on the basis of examples and with reference to the drawings, in which.

DETAILED DESCRIPTION OF THE INVENTION

Figure 1:
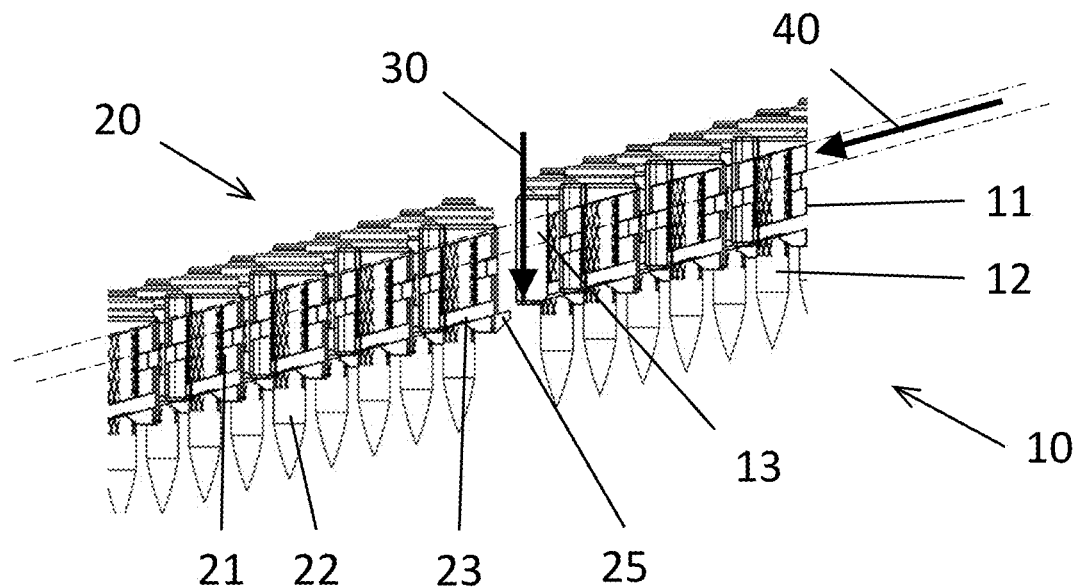
FIG. 1 shows two strips of fastening elements in a partial side view.

FIG. 1 shows a first strip 10 of fastening elements and a second strip 20 of fastening elements in a partial side view. The first strip 10 of fastening elements comprises a multiplicity of first receiving elements 11, configured as sleeves, and first fastening elements 12 which are received in the first receiving elements 11 and each define a fastening direction 30, which is the same for all first fastening elements 12. The first receiving elements 11 are arranged in two rows along a transport direction 40. The second strip 20 of fastening elements comprises a multiplicity of second receiving elements 21, configured as sleeves, and second fastening elements 22 which are received in the second receiving elements 21 and are each oriented in the fastening direction 30. The second receiving elements 21 are arranged in two rows along the transport direction 40. In the transport direction 40, the first strip 10 of fastening elements forms a succeeding strip of fastening elements, and the second strip 20 of fastening elements forms a preceding strip of fastening elements.

The fastening direction 30 and the transport direction 40 enclose an angle of 70°. A rearmost receiving element 23 of the second strip 20 of fastening elements has a counter-support element 25, which supports the rearmost receiving element 23 on a frontmost receiving element 13 of the first strip 10 of receiving elements in the fastening direction 30. The counter-support element 25 is for this purpose configured as a counter-support projection, which protrudes from the rearmost receiving element 23 counter to the transport direction 40 and bears from below on the frontmost receiving element 13 of the first strip 10 of fastening elements. The first and second strips 10, 20 of fastening elements thus engage in each other in a form-fit manner with respect to the fastening direction 30.

Figure 2:
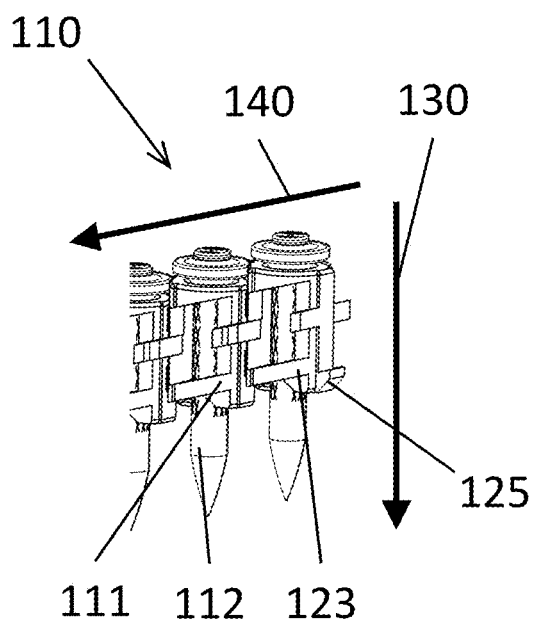
FIG. 2 shows one strip of fastening elements in a partial side view.

FIG. 2 shows a strip 110 of fastening elements in a partial side view. The strip 110 of fastening elements comprises a multiplicity of receiving elements 111, configured as sleeves, and fastening elements 112 which are received in the receiving elements 111 and each define a fastening direction 130, which is the same for all fastening elements 112. The first receiving elements 111 are arranged in one row along a transport direction 140.

The fastening direction 130 and the transport direction 140 enclose an angle of 70°. A rearmost receiving element 123 of the strip 110 of fastening elements in the transport direction 140 has a counter-support element 125, which supports the rearmost receiving element 123 in the fastening direction 130. The counter-support element 125 is for this purpose configured as a counter-support projection, which protrudes from the rearmost receiving element 123 counter to the transport direction 140.

Figure 3:
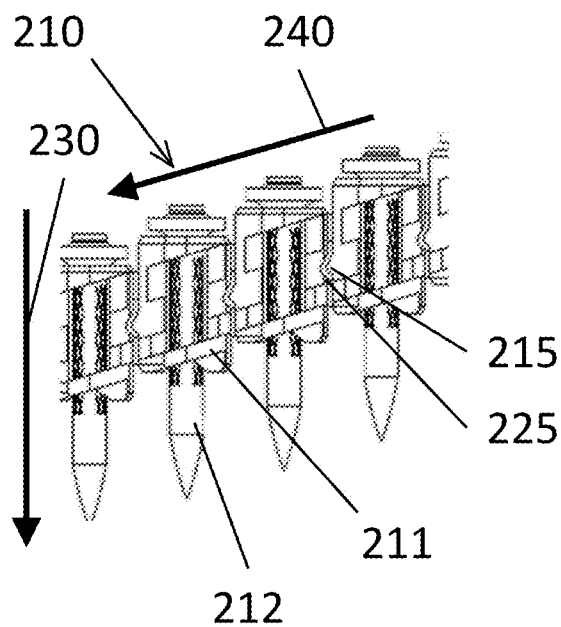
FIG. 3 shows two strips of fastening elements in a partial side view.

FIG. 3 shows a strip 210 of fastening elements in a partial side view. The strip 210 of fastening elements comprises a multiplicity of receiving elements 211 configured as sleeves and fastening elements 212 which are received in the receiving elements 211 and each define a fastening direction 230, which is the same for all fastening elements 212. The first receiving elements 211 are arranged in a row along a transport direction 240. The fastening direction 230 and the transport direction 240 enclose an angle of 70°.

For simplified production, all the receiving elements 211 have the same contour. Each receiving element 211 of the strip 210 of fastening elements has a support element 215, configured as a support projection, and a counter-support element 225, configured as a counter-support projection, which protrude from the respective receiving element 211 in the transport direction 240 and counter to the transport direction 240, respectively. The support element of a frontmost receiving element (not shown) of the strip 210 of fastening elements supports the frontmost receiving element, on the counter-support element of a rearmost receiving element (likewise not shown) of a strip of fastening elements preceding in transport direction 240, counter to the fastening direction. The counter-support element of a rearmost receiving element (not shown) of the strip 210 of fastening elements supports the rearmost receiving element, on the support element of a frontmost receiving element (likewise not shown) of a strip of fastening elements succeeding in transport direction 240, in the fastening direction.

The invention has been described using a series of exemplary embodiments. The individual features of the various exemplary embodiments can be used individually or in any desired combination with one another, provided that they are not contradictory. It should be noted that the strip of fastening elements according to the invention can also be used for other applications.

The invention claimed is:

1. A strip of fastening elements having receiving elements and fastening elements received in the receiving elements, said fastening elements each defining a fastening direction that is the same for all of the fastening elements, wherein the receiving elements are arranged in at least one row, which defines a transport direction, the at least one row including a frontmost receiving element and a rearmost receiving element, wherein the fastening direction and the transport direction enclose an acute angle, wherein the strip of fastening elements has a support element that is formed as a projection protruding from the frontmost receiving element in the transport direction and that engages a counter-support element that is formed as a counter-support projection protruding from the rearmost receiving element of the preceding strip counter to the transport direction;

wherein the support element and the counter-support element have complementary contours.

2. The strip of fastening elements as claimed in claim 1, wherein the receiving elements each comprise a sleeve, in which one of the fastening elements is received.

3. A fastening device having a magazine, a first strip of fastening elements and a second strip of fastening elements, wherein the magazine has a transport channel for transport of the first and second strips of fastening elements in a transport direction, wherein the first and second strips of fastening elements are configured as claimed in claim 1.

4. The fastening device as claimed in claim 3, wherein the support element of the strip of fastening elements succeeding in the transport direction and the counter-support element of the strip of fastening elements preceding in the transport direction are in engagement with each other and support each other.

5. The fastening device as claimed in claim 3, wherein the support element of the strip of fastening elements succeeding in the transport direction and the rearmost receiving element of the strip of fastening elements preceding in the transport direction are in engagement with each other and support each other.

6. The fastening device as claimed in claim 3, wherein the counter-support element of the strip of fastening elements preceding in the transport direction and the frontmost receiving element of the strip of fastening elements succeeding in the transport direction are in engagement with each other and support each other.

7. A first strip of fastening elements having receiving elements and fastening elements received in the receiving elements, and a second strip of fastening elements having receiving elements and fastening elements received in the receiving elements, the first strip of fastening elements succeeding the second strip of fastening elements in a transport direction;

the fastening elements in the first strip and the second strip each defining a fastening direction that is the same for all of the fastening elements, wherein the receiving elements in the first strip of fastening elements and in the second strip of fastening elements are respectively arranged in at least one row, which defines the transport direction, the at least one row in the first strip of fastening elements and in the second strip of fastening elements including a frontmost receiving element and a rearmost receiving element, wherein the fastening direction and the transport direction enclose an acute angle, wherein the first strip of fastening elements has a support element that is formed as a projection protruding from the frontmost receiving element in the transport direction and that engages a counter-support element that is formed as a counter-support projection protruding from the rearmost receiving element of the second strip of fastening elements;

wherein the support element of the first strip of fastening elements and the counter-support element of the second strip of fastening elements have complementary contours engaging each other.

\* \* \* \* \*